US009769659B2

(12) United States Patent
Buchmayer et al.

(10) Patent No.: US 9,769,659 B2
(45) Date of Patent: Sep. 19, 2017

(54) ACCESS CONTROL FOR A WIRELESS LOCAL AREA NETWORK (75) Inventors: Mats Buchmayer, Stockholm (SE); Oscar Zee, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 25 days.

(21) Appl. No.: 14/419,690

(22) PCT Filed: Aug. 23, 2012

(86) PCT No.: PCT/EP2012/066461
§ 371 (c)(1),
(2), (4) Date: Feb. 5, 2015

(87) PCT Pub. No.: WO2014/029443
PCT Pub. Date: Feb. 27, 2014

(65) Prior Publication Data
US 2015/0223062 A1    Aug. 6, 2015

(51) Int. Cl.
*H04W 12/06* (2009.01)
*H04W 76/02* (2009.01)
*H04W 8/06* (2009.01)
*H04L 29/06* (2006.01)
*H04W 12/08* (2009.01)
(Continued)

(52) U.S. Cl.
CPC .......... *H04W 12/06* (2013.01); *H04L 63/162* (2013.01); *H04W 8/06* (2013.01); *H04W 76/02* (2013.01); *H04W 12/08* (2013.01); *H04W 84/12* (2013.01); *H04W 88/06* (2013.01)

(58) Field of Classification Search
CPC ....... H04W 12/06; H04W 8/06; H04W 84/12; H04W 88/06; H04W 12/08; H04W 76/02–76/028
See application file for complete search history.

(56) References Cited

U.S. PATENT DOCUMENTS

2005/0154895 A1    7/2005  Zhang
2006/0123470 A1*   6/2006  Chen ...................... H04L 63/08
                                                   726/5
(Continued)

OTHER PUBLICATIONS

Ahmavaara, H., et al., "Interworking Architecture Between 3GPP and WLAN Systems", IEE Communications Magazine, Nov. 1, 2003, pp. 74-81, vol. 41, No. 11, IEEE.
(Continued)

*Primary Examiner* — Pao Sinkantarakorn
*Assistant Examiner* — Kabir Jahangir
(74) *Attorney, Agent, or Firm* — Coats & Bennett, PLLC (57) ABSTRACT According to a first aspect there is provided a method of operating an entity of a Wireless Local Area Network (WLAN). The method comprises receiving a Media Access Control (MAC) address for a device that is attempting to associate with the WLAN (S101), and determining if an International Mobile Subscriber Identity (IMSI) associated with the MAC address is stored in the WLAN (S102). The method further comprises, if an IMSI associated with the MAC address is not stored in the WLAN, obtaining an IMSI for the device during authentication of device stored IMSI of the device to the WLAN (S103), and causing storage within the WLAN of the obtained IMSI in association with the MAC address (S104).

24 Claims, 6 Drawing Sheets (51) Int. Cl.
*H04W 84/12* (2009.01)
*H04W 88/06* (2009.01)

(56) References Cited

U.S. PATENT DOCUMENTS

| | | | | |
|---|---|---|---|---|
| 2006/0128362 | A1* | 6/2006 | Bae | H04L 63/08 455/411 |
| 2006/0209768 | A1* | 9/2006 | Yan | H04L 29/12311 370/338 |
| 2008/0304458 | A1* | 12/2008 | Aghvami | H04W 48/16 370/338 |
| 2011/0081890 | A1* | 4/2011 | Ahmadvand | H04M 15/00 455/411 |
| 2011/0191835 | A1* | 8/2011 | Hawkes | H04W 12/08 726/6 |
| 2012/0144189 | A1* | 6/2012 | Zhong | H04L 63/0853 713/155 |
| 2013/0097418 | A1* | 4/2013 | Bhatt | H04L 63/0892 713/151 |
| 2013/0097674 | A1* | 4/2013 | Jindal | H04L 63/0876 726/4 |
| 2013/0273857 | A1* | 10/2013 | Zhang | H04B 15/00 455/73 |
| 2013/0288644 | A1* | 10/2013 | Schroeder | H04W 12/06 455/411 |
| 2014/0086211 | A1* | 3/2014 | Liu | H04W 36/22 370/331 |
| 2014/0146806 | A1* | 5/2014 | Liu | H04W 8/04 370/338 |

OTHER PUBLICATIONS

Wang, C., et al., "A System Level Simulation Platform for the Study of QoS Provisioning in UMTS / WLAN Interworking", The 1st International Conference on Information Science and Engineering, Dec. 26, 2009, pp. 2518-2521, IEEE Computer Society.

* cited by examiner

ACCESS CONTROL FOR A WIRELESS LOCAL AREA NETWORK

TECHNICAL FIELD

The present invention relates to an entity of a Wireless Local Area Network (WLAN) and a method of operating an entity of a WLAN. More particularly, the invention relates to an entity of a WLAN and a method of operating an entity of a WLAN for determining an International Mobile Subscriber Identity (IMSI) associated with a device that is attempting to associate with the WLAN.

BACKGROUND

Data traffic in mobile telecommunications networks is continually increasing. Consequently, operators are employing heterogeneous access networks that utilise multiple radio access technologies (RATs) in order to provide greater capacity, particularly in high traffic areas and areas that otherwise have poor network coverage.

Figure 1:
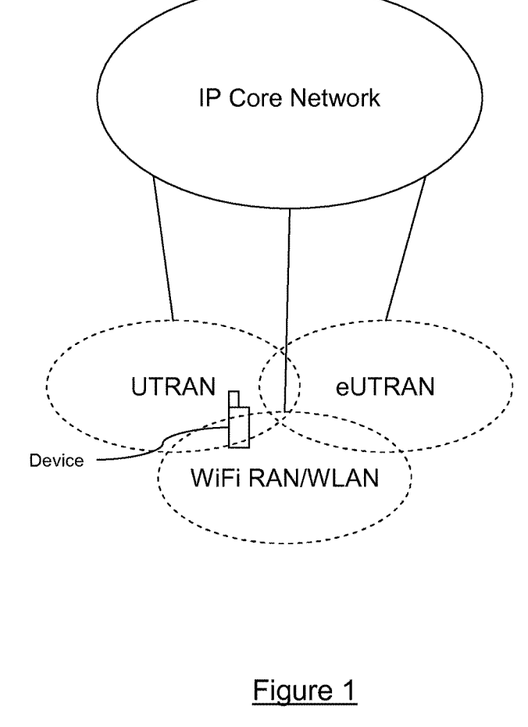
FIG. 1 illustrates schematically an example of a heterogeneous access network.

Typically, the radio access technologies utilised as part of these heterogeneous access networks include UMTS Radio Access Network (UTRAN) and an Evolved UTRAN (eUTRAN), and Wi-Fi/WLAN. For example, FIG. 1 illustrates schematically a heterogeneous access network comprised of a UTRAN, an eUTRAN, and a Wi-Fi RAN/WLAN. In this regard, both the UTRAN and eUTRAN standards are defined by the 3rd Generation Partnership Project (3GPP), and the relevant 3GPP standards therefore define capabilities for handling load sharing between these 3GPP RANs. In contrast, the Wi-Fi/WLAN standards are defined by the Institute of Electrical and Electronics Engineers (IEEE), and neither the IEEE standards nor the 3GPP standards define capabilities for handling load sharing between Wi-Fi/WLAN and the 3GPP RANs.

In particular, for most currently available devices (i.e. user equipments (UE), stations (STA) etc) when the device is within the coverage of both a Wi-Fi RAN/WLAN and a 3GPP RAN, the device will automatically attempt to connect to the Wi-Fi RAN/WLAN and will detach from the 3GPP RAN. Therefore, the decision to move from the 3GPP RAN to the WLAN is made without having considered the load and/or performance of either RAN, and can result in a reduction in performance that is detrimental to both the networks and the user.

In order to provide at least some form of load steering between a Wi-Fi RAN/WLAN and a 3GPP RAN, it is currently being proposed that a simple defer mechanism is implemented within the Wi-Fi RAN/WLAN. According to such a defer mechanism, when a device attempts to associate with the Wi-Fi RAN/WLAN, any relevant conditions are evaluated and it is thereby determined whether the device should use the Wi-Fi RAN/WLAN or an available 3GPP RAN. The Wi-Fi RAN/WLAN can then accept or reject the attempt to associate with the Wi-Fi RAN/WLAN in accordance with this determination, thereby steering the device to either the Wi-Fi RAN/WLAN or the 3GPP RAN.

Ideally, the conditions evaluated by the Wi-Fi RAN/WLAN will include any of current and/or predicted load and/or performance of both the Wi-Fi RAN/WLAN and the 3GPP RAN, and the current and/or predicted performance of the device (e.g. the radio link between the device and the RAN). However, in order to be able to obtain load and/or performance information from the 3GPP RAN, the Wi-Fi RAN/WLAN needs to be able to identify the device in the 3GPP RAN using a permanent 3GPP identifier that is associated with the device, such as the International Mobile Subscriber Identity (IMSI).

Figure 2:
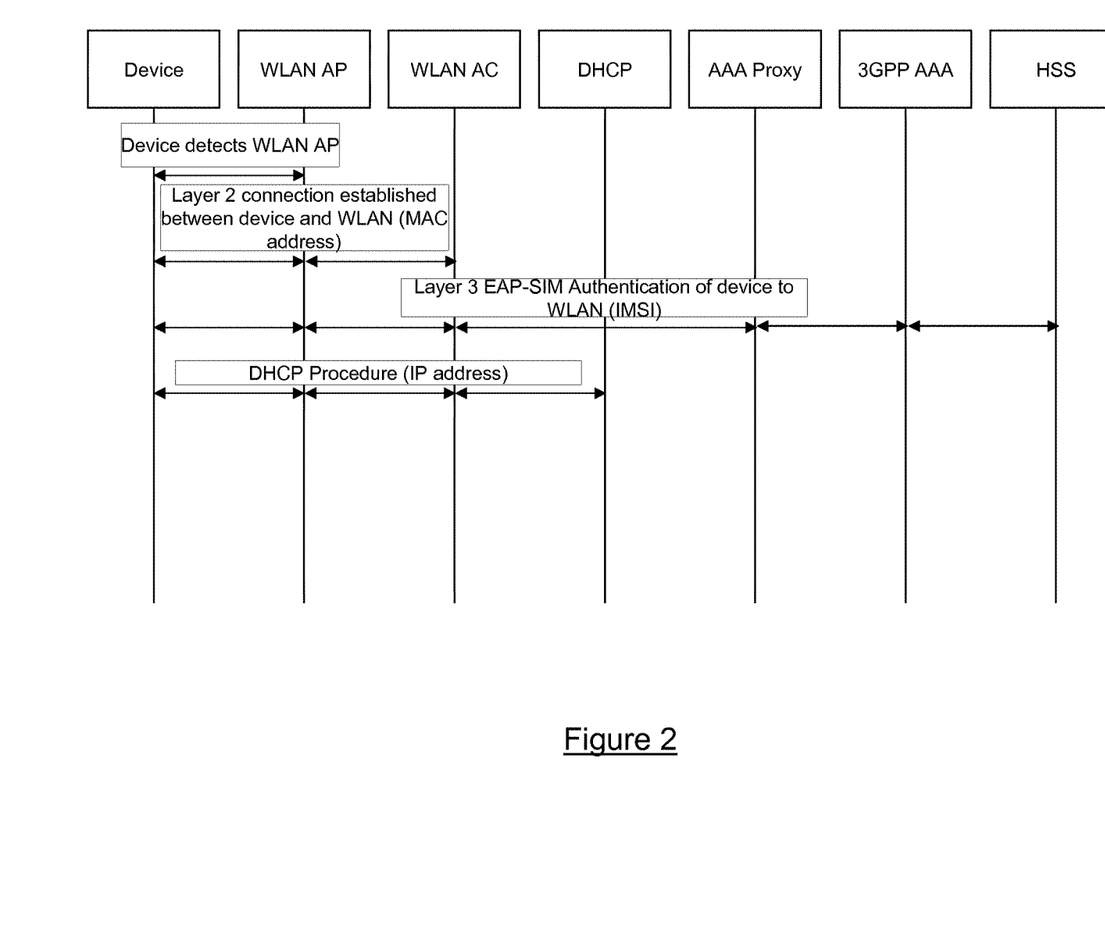
FIG. 2 is a signalling flow diagram that illustrates the conventional procedures implemented when a device associated with a WLAN.

Whilst the a 3GPP identifier such as the IMSI associated with the device can be obtained if the device is authenticated to the Wi-Fi RAN using either the Extensible Authentication Protocol Method for GSM Subscriber Identity Module (EAP-SIM) or the Extensible Authentication Protocol Method for 3rd Generation Authentication and Key Agreement (EAP-AKA), this authentication is a network layer (Layer 3) process that will typically be initiated after the establishment of a data link layer (Layer 2) connection between the device and an Access Point (AP) of the Wi-Fi RAN/WLAN. Consequently, the Wi-Fi RAN/WLAN cannot obtain the IMSI until relatively late in the attachment process, which can therefore cause problems if the device is subsequently deferred away from the Wi-Fi RAN/WLAN. For example, FIG. 2 is a signalling flow diagram that illustrates the conventional procedures implemented when a device associated with a WLAN.

In particular, as it is often the case that a device will temporarily lose connectivity with a Wi-Fi RAN/WLAN, most devices will be configured to attempt to re-attach to a WLAN AP. Therefore, if a data link layer connection has already been established, such that the device has already been provided with an IP address before the deferral decision is made, then this will often result in the device attempting to re-attach to the WLAN AP after a deferral, thereby preventing the device from being steered towards the 3GPP RAN.

SUMMARY

In order to at least mitigate the problems identified above there will now be described methods and apparatus for enabling a WLAN to make an early determination of an International Mobile Subscriber Identity (IMSI) associated with a device that is attempting to associate with the WLAN. In doing so, the method provides that the WLAN can make early use of the IMSI to obtain information relating to the device from a 3GPP RAN, thereby effectively accelerating any processes that rely on this information.

According to a first aspect there is provided a method of operating an entity of a Wireless Local Area Network (WLAN). The method comprises receiving a Media Access Control (MAC) address for a device that is attempting to associate with the WLAN, and determining if an International Mobile Subscriber Identity (IMSI) associated with the MAC address is stored in the WLAN. The method further comprises, if an IMSI associated with the MAC address is not stored in the WLAN, obtaining an IMSI for the device during authentication of the device to the WLAN, and causing storage within the WLAN of the obtained IMSI in association with the MAC address.

The MAC address may be obtained during establishment of a Layer 2 connection between the device and the WLAN.

The method may further comprise, if the WLAN does store an IMSI associated with the MAC address, using the stored IMSI to obtain information related to the device from a 3GPP RAN.

The device may be authenticated using any of Extensible Authentication Protocol Method for 3rd Generation Authentication and Key Agreement (EAP-AKA), and Extensible Authentication Protocol Method for Global System for Mobile Communications Subscriber Identity Modules (EAP-SIM).

The step of determining if an IMSI associated with the MAC address is stored in the WLAN may comprise sending a request for an IMSI to a further entity of the WLAN, the request including the MAC address, and receiving a response from the further entity of the WLAN. The step of causing storage within the WLAN of the obtained IMSI in association with the MAC address may then comprise sending a storage request to a further entity of the WLAN, the storage request including the obtained IMSI and the MAC address.

Alternatively, the step of determining if an IMSI associated with the MAC address is stored in the WLAN may comprise determining if the entity stores an IMSI associated with MAC address. The step of causing storage within the WLAN of the obtained IMSI in association with the MAC address may then comprise storing the obtained IMSI in association with MAC address at the entity.

The entity of the WLAN may be a WLAN Access Point (AP). The further entity of the WLAN may then be a WLAN Access Controller (AC). Alternatively, the entity of the WLAN may be a WLAN Access Controller (AC).

According to a second aspect there is provided an entity of a Wireless Local Area Network (WLAN). The entity comprises a receiver configured to receive a Media Access Control (MAC) address for a device that is attempting to associate with the WLAN, and a processor configured to determine if an International Mobile Subscriber Identity (IMSI) associated with the MAC address is stored in the WLAN. If an IMSI associated with the MAC address is not stored in the WLAN, then the processor is configured to obtain an IMSI for the device during authentication of the device to the WLAN, and to cause storage within the WLAN of the obtained IMSI in association with the MAC address.

If the WLAN does store an IMSI associated with the MAC address, the processor may be configured to use the stored IMSI to obtain information related to the device from a 3GPP RAN.

The receiver may be configured to receive the MAC address during establishment of a Layer 2 connection between the device and the WLAN.

To determine if an IMSI associated with the MAC address is stored in the WLAN, the processor may be configured to generate a request for an IMSI, the request including the MAC address, and the entity may further comprise a transmitter for sending the request for an IMSI to a further entity of the WLAN, and the receiver may be configured to receive a response from the further entity of the WLAN. To cause storage within the WLAN of the obtained IMSI in association with the MAC address, the processor may be configured to generate a storage request, the storage request including the obtained IMSI and the MAC address, and the transmitter may be configured to send the storage request to the further entity of the WLAN.

Alternatively, to determine if an IMSI associated with the MAC address is stored in the WLAN, the processor may be configured to determine if the entity stores an IMSI associated with MAC address. To cause storage within the WLAN of the obtained IMSI in association with the MAC address, the processor may be configured to store the obtained IMSI in association with MAC address at the entity.

The entity of the WLAN may be a WLAN Access Point (AP). The further entity of the WLAN may then be a WLAN Access Controller (AC).

Alternatively, the entity of the WLAN may be a WLAN Access Controller (AC). The processor may then be configured to authenticate the device using any of Extensible Authentication Protocol Method for 3rd Generation Authentication and Key Agreement (EAP-AKA) and Extensible Authentication Protocol Method for Global System for Mobile Communications Subscriber Identity Modules (EAP-SIM).

BRIEF DESCRIPTION OF THE DRAWINGS

Some embodiments of the present invention will now be described in detail with reference to the accompanying drawings, in which.

DETAILED DESCRIPTION

In order to at least mitigate the problems identified above there will now be described a method of operating an entity of a Wireless Local Area Network (WLAN) that enables the WLAN to make an early determination of an International Mobile Subscriber Identity (IMSI) associated with a device that is attempting to associate with the WLAN. In doing so, the method provides that the WLAN can make early use of the IMSI to obtain information relating to the device from a 3GPP RAN, thereby effectively accelerating any processes that rely on this information.

The method involves the entity receiving a Media Access Control (MAC) address for a device that is attempting to associate with the WLAN, and determining if an IMSI associated with the MAC address is stored in the WLAN. If an IMSI associated with the MAC address is not stored in the WLAN, then the entity obtains an IMSI for the device during authentication of the device to the WLAN, and causes storage within the WLAN of the obtained IMSI in association with the MAC address. If the WLAN does store an IMSI associated with the MAC address, then the entity can use the stored IMSI to obtain information related to the device from a 3GPP RAN. In this regard, the entity can obtain MAC address during the establishment of a Layer 2 connection between the device and the WLAN. By way of example, the WLAN entity could be any of a WLAN Access Controller (AC) and a WLAN Access Point (AP).

In other words, during an initial/first attempt by the device to associate with the WLAN, the IMSI associated with the device is obtained as a result of the authentication of the device to the WLAN. The IMSI of the device is then stored in the WLAN in association with the MAC address of the device. Then, when the device subsequently makes a further attempt to associate with the WLAN, the MAC address of the device can be obtained during establishment of a Layer 2 connection between the device and the WLAN, and the MAC address can then be used to obtain the IMSI that has been stored in the WLAN prior to authenticating the device.

The WLAN entity can be configured to store an IMSI and an associated MAC address locally, such that the step of causing storage within the WLAN of the obtained IMSI in association with the MAC address will involve storing the obtained IMSI in association with MAC address at the entity. The step of determining if an IMSI associated with the MAC address is stored in the WLAN would then involve determining if the entity stores an IMSI associated with MAC address. Alternatively, the WLAN entity can be configured to cause a further entity of the WLAN to store an IMSI and an associated MAC address. To do so, the entity could send a storage request to the further entity, the storage request including an obtained IMSI and the associated MAC address. The step of determining if an IMSI associated with the MAC address is stored in the WLAN would then involve sending a request for an IMSI to the further entity, the request including the MAC address, and receiving a response from the further entity. The response would then either include an associated IMSI or would indicate that the further entity does not store an IMSI associated with the MAC address.

For example, if the WLAN entity was a WLAN AC, then the WLAN AC could be configured to store an IMSI and an associated MAC address locally. As an alternative example, the WLAN AC could be configured to cause some further entity of the WLAN to store an IMSI and an associated MAC address. The WLAN AC would then be configured to request an IMSI from this further entity. As a yet further example, if the WLAN entity was a WLAN AP, then the WLAN AP could be configured to cause a WLAN AC to store an IMSI and an associated MAC address. The WLAN AP would then be configured to request an IMSI from the WLAN AC.

Figure 3:
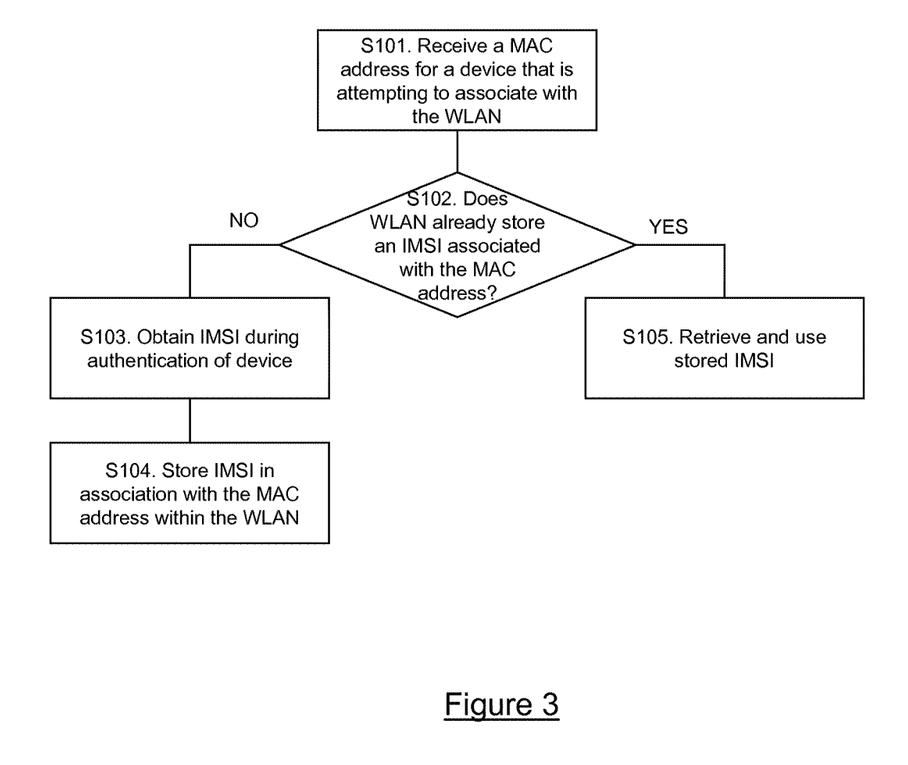
FIG. 3 is a flow diagram illustrating an example of the procedure implemented by an entity of a WLAN in accordance with the methods described herein.

FIG. 3 is a flow diagram illustrating an example of the procedure implemented by an entity of a WLAN when a device attempts to associate with the WLAN. The steps performed are as follows:

S101. The WLAN entity receives a MAC address for the device that is attempting to associate with the WLAN. For example, if the WLAN entity is a WLAN AP then the WLAN AP will receive the MAC address during the establishment of Layer 2 connection between the device and the WLAN. As an alternative example, if the WLAN entity is a WLAN AC, then the WLAN AC will receive the MAC address from the WLAN AP.

S102. The WLAN entity then determines if an IMSI associated with the MAC address is stored in the WLAN. For example, the WLAN entity can determine if an IMSI associated with the MAC address is stored locally at the entity, or can check whether a further entity of the WLAN stores an IMSI associated with the MAC address.

S103. If the WLAN entity determines that the WLAN does not store an IMSI associated with the MAC, then the WLAN entity obtains an IMSI for the device during authentication of the device to the WLAN.

S104. The WLAN entity then causes storage within the WLAN of the obtained IMSI in association with the MAC address.

S105. If the WLAN entity determines that the WLAN does store an IMSI associated with the MAC, then the WLAN entity retrieves the stored IMSI for use in obtaining information relating to the device from a 3GPP RAN.

Figure 4:
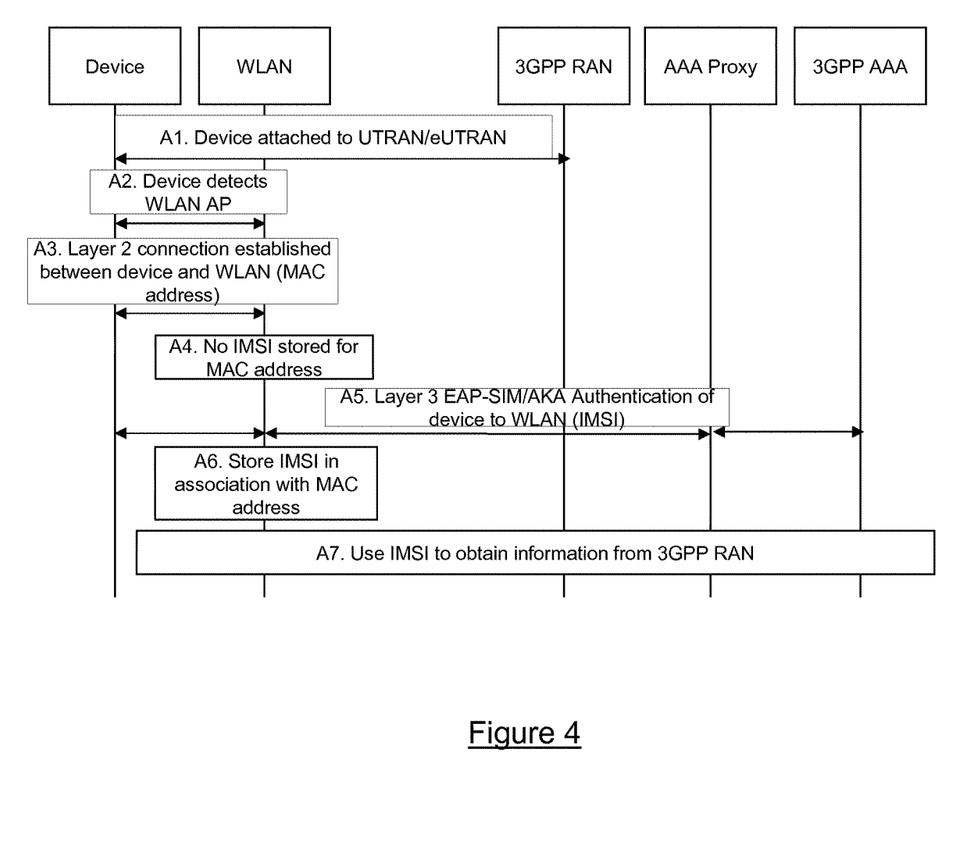
FIG. 4 is a signalling flow diagram illustrating the procedures implemented when a device makes a first/initial attempt to associate with the WLAN in accordance with the methods described herein.

FIG. 4 is a signalling flow diagram illustrating the procedures implemented when a device makes a first/initial attempt to associate with the WLAN in accordance with the methods described. The steps performed are as follows:

A1. The device is attached to a 3GPP RAN, such as a UTRAN or eUTRAN.

A2. The device then detects a WLAN AP and therefore attempts to associate with the WLAN.

A3. The device therefore establishes a Layer 2 connection with the WLAN, during which the WLAN will receive the MAC address for the device. For example, during the establishment of the Layer 2 connection between the device and the WLAN AP, the WLAN AP will obtain the MAC address. Therefore, if the WLAN entity described above is provided by an entity other than the WLAN AP, then the WLAN AP will provide the MAC address to this entity.

A4. The entity within the WLAN uses the received MAC address to determine if the WLAN stores an IMSI associated with the MAC address. In this example, as this is the first time that the device has attempted to associate with the WLAN, the WLAN does not store an IMSI associated with the MAC address. The WLAN entity therefore cannot determine an IMSI for the device until the device is authenticated.

A5. The WLAN then proceeds to authenticate the device using either EAP-SIM or EAP-AKA procedures, thereby allowing the WLAN entity to obtain an IMSI for the device.

A6. The WLAN entity then causes storage of the obtained IMSI and the associated MAC address within the WLAN.

A7. The WLAN can then also use the IMSI to obtain information relating to the device from the 3GPP RAN.

Figure 5:
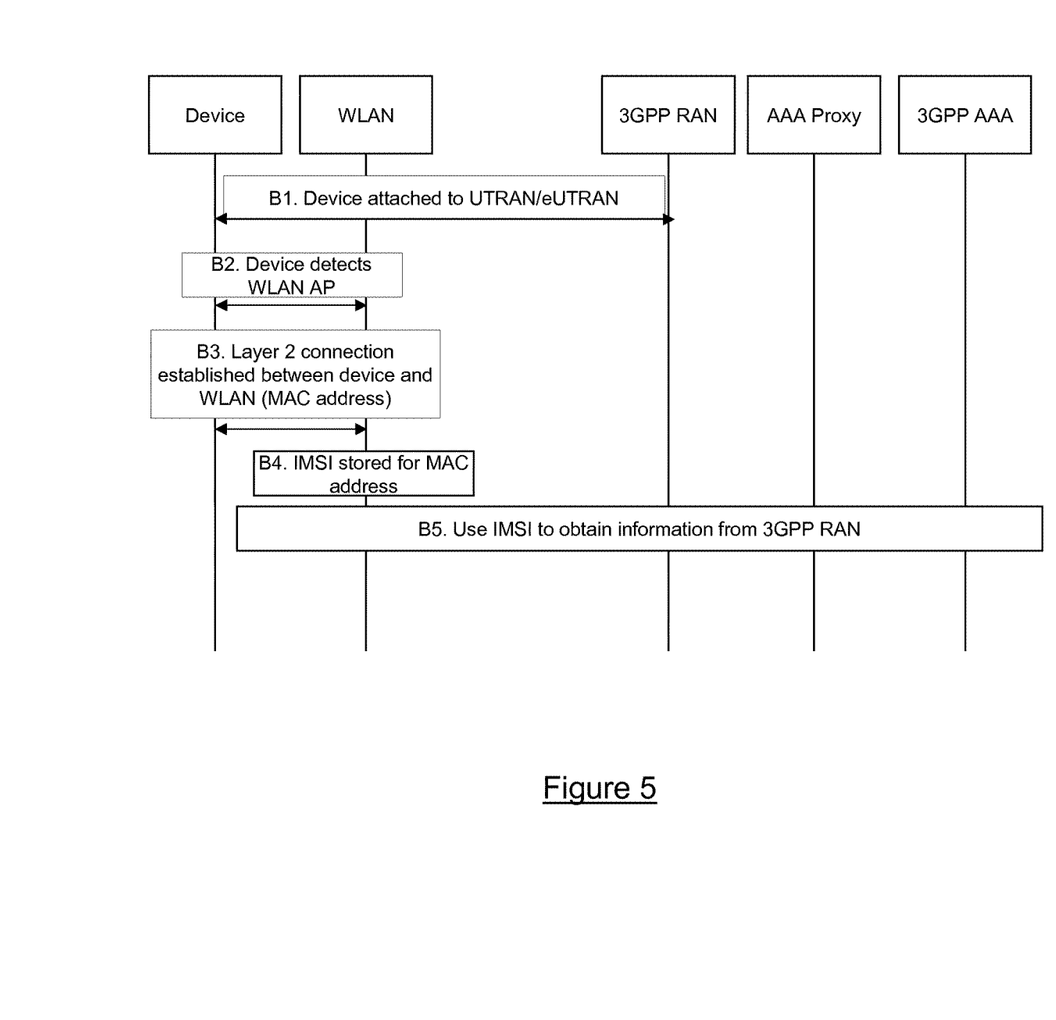
FIG. 5 is a signalling flow diagram illustrating the procedures implemented when a device makes a subsequent attempt to associate with the WLAN in accordance with the methods described herein.

FIG. 5 is a signalling flow diagram illustrating the procedures implemented when the device makes a subsequent attempt to associate with the WLAN in accordance with the methods described. The steps performed are as follows:

B1. The device is attached to a 3GPP RAN, such as a UTRAN or eUTRAN.

B2. The device then detects a WLAN AP and therefore attempts to associate with the WLAN.

B3. The device therefore establishes a Layer 2 connection with the WLAN, during which the WLAN will receive the MAC address for the device.

B4. An entity within the WLAN uses the received MAC address to determine if the WLAN stores an IMSI associated with the MAC address. In this example, as this is the device has previously attempted to associate with the WLAN, the WLAN does store an IMSI associated with the MAC address. The WLAN entity therefore retrieves the stored IMSI.

B5. The WLAN can then use the stored IMSI to obtain information relating to the device from a 3GPP RAN. For example, the WLAN can obtain load and/or performance information relating a cell of the 3GPP RAN to which the device is attached, and can then use this information when making a deferral decision (i.e. when determining whether to accept of reject the attempt to associate with the WLAN).

Figure 6:
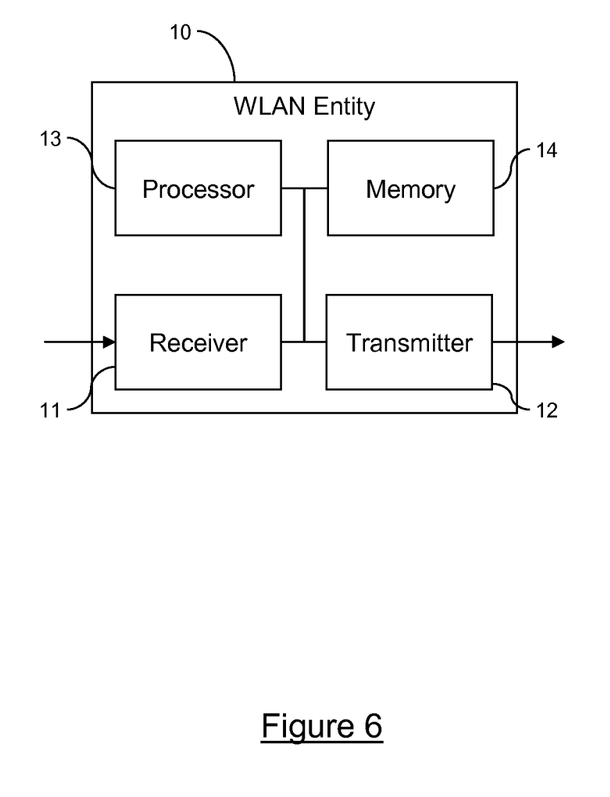
FIG. 6 illustrates schematically an embodiment of a WLAN entity configured to implement the methods described herein.

FIG. 6 illustrates schematically an embodiment of a WLAN entity 10 configured to implement the methods described above. The WLAN entity 10 can be implemented as a combination of computer hardware and software and comprises a receiver 11, transmitter 12, a processor 13, and a memory 14. The memory 14 stores the various programs/executable files that are implemented by the processor 13, and also provides a storage unit for any required data. For example, the memory 14 can store any previously obtained IMSIs and the associated MAC addresses (if these are stored at the WLAN entity). The programs/executable files stored in the memory 14, and implemented by the processor, include but are not limited to a MAC address retrieval unit, an IMSI retrieval unit, an IMSI storage unit, and a 3GPP information retrieval unit configured to implement the methods described above.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration. In addition, whilst the above described embodiments specifically relate to heterogeneous networks comprised of at least a 3GPP RAN and a Wi-Fi RAN, the principles of the methods described herein are equally applicable to heterogeneous networks that comprise other radio access technologies; such as Global System for Mobile Communications (GSM), cdmaOne and CDMA2000.

The invention claimed is:

1. A method of operating an entity of a Wireless Local Area Network (WLAN), the method comprising:
   receiving a Media Access Control (MAC) address for a device that is currently attempting to associate with the WLAN;
   determining if an International Mobile Subscriber Identity (IMSI) associated with the MAC address is stored in the WLAN; and
   in response to an IMSI associated with the MAC address not being stored in the WLAN:
      obtaining an IMSI for the device during authentication of the device to the WLAN; and
      causing storage, within the WLAN, of the obtained IMSI in association with the MAC address.

2. The method of claim 1, wherein the MAC address is obtained during establishment of a Layer 2 connection between the device and the WLAN.

3. The method of claim 1, wherein, in response to an IMSI already being associated with the MAC address in the WLAN, using the stored IMSI to obtain information related to the device from a 3GPP Radio Access Network (RAN).

4. The method of claim 1, wherein the device is authenticated using any of:
   Extensible Authentication Protocol Method for 3rd Generation Authentication and Key Agreement (EAP-AKA); and
   Extensible Authentication Protocol Method for Global System for Mobile Communications Subscriber Identity Modules (EAP-SIM).

5. The method of claim 1, wherein the determining if an IMSI associated with the MAC address is stored in the WLAN comprises:
   sending a request for an IMSI to a further entity of the WLAN, the request including the MAC address; and
   receiving a response from the further entity of the WLAN.

6. The method of claim 5:
   wherein the entity of the WLAN is a WLAN Access Point (AP);
   wherein the further entity of the WLAN is a WLAN Access Controller (AC).

7. The method of claim 1, wherein the causing storage within the WLAN of the obtained IMSI in association with the MAC address comprises sending a storage request to a further entity of the WLAN, wherein the storage request includes the obtained IMSI and the MAC address.

8. The method of claim 7:
   wherein the entity of the WLAN is a WLAN Access Point (AP);
   wherein the further entity of the WLAN is a WLAN Access Controller (AC).

9. The method of claim 1, wherein the determining if an IMSI associated with the MAC address is stored in the WLAN comprises determining if the entity stores an IMSI associated with MAC address.

10. The method of claim 1, wherein the causing storage within the WLAN of the obtained IMSI in association with the MAC address comprises storing the obtained IMSI in association with MAC address at the entity.

11. The method of claim 1, wherein the entity of the WLAN is a WLAN Access Point (AP).

12. The method of claim 1, wherein the entity of the WLAN is a WLAN Access Controller (AC).

13. An entity of a Wireless Local Area Network (WLAN), the entity comprising:
   a receiver configured to receive a Media Access Control (MAC) address for a device that is currently attempting to associate with the WLAN;
   a processing circuit configured to:
      determine if an International Mobile Subscriber Identity (IMSI) associated with the MAC address is stored in the WLAN;
      in response to an IMSI associated with the MAC address not being stored in the WLAN:
         obtain an IMSI for the device during authentication of the device to the WLAN; and
         cause storage, within the WLAN, of the obtained IMSI in association with the MAC address.

14. The entity of claim 13, wherein the receiver is configured to receive the MAC address during establishment of a Layer 2 connection between the device and the WLAN.

15. The entity of claim 13, wherein the processing circuit is configured to, in response to the IMSI associated with the MAC address already being stored in the WLAN, use the stored IMSI to obtain information related to the device from a 3GPP Radio Access Network (RAN).

16. The entity of claim 13:
   wherein the processing circuit is configured to determine if an IMSI associated with the MAC address is stored in the WLAN by generating a request for an IMSI, wherein the request includes the MAC address;
   wherein the entity further comprises a transmitter configured to send the request for an IMSI to a further entity of the WLAN;
   wherein the receiver is configured to receive a response from the further entity of the WLAN.

17. The entity of claim 16:
   wherein the entity of the WLAN is a WLAN Access Point (AP);
   wherein the further entity of the WLAN is a WLAN Access Controller (AC).

18. The entity of claim 16:
   wherein the processing circuit is configured to cause storage, within the WLAN, of the obtained IMSI in association with the MAC address by generating a storage request, wherein the storage request includes the obtained IMSI and the MAC address;

wherein the transmitter is configured to send the storage request to the further entity of the WLAN.

19. The entity of claim 18:

wherein the entity of the WLAN is a WLAN Access Point (AP);

wherein the further entity of the WLAN is a WLAN Access Controller (AC).

20. The entity of claim 13, wherein the processing circuit is configured to determine if an IMSI associated with the MAC address is stored in the WLAN by determining if the entity stores an IMSI associated with MAC address.

21. The entity of claim 13, wherein the processing circuit is configured to cause storage within the WLAN of the obtained IMSI in association with the MAC address by storing the obtained IMSI in association with MAC address at the entity.

22. The entity of claim 13, wherein the entity of the WLAN is a WLAN Access Point (AP).

23. The entity of claim 13, wherein the entity of the WLAN is a WLAN Access Controller (AC).

24. The entity of claim 23, wherein the processing circuit is configured to authenticate the device using any of:

Extensible Authentication Protocol Method for 3rd Generation Authentication and Key Agreement (EAP-AKA); and Extensible Authentication Protocol Method for Global System for Mobile Communications Subscriber Identity Modules (EAP-SIM).

* * * * *